United States Patent
Hayee et al.

(10) Patent No.: US 11,320,284 B2
(45) Date of Patent: May 3, 2022

(54) REAL-TIME LANE DEPARTURE DETECTION USING MAP SHAPE POINTS AND TRAJECTORY HISTORIES

(71) Applicant: Regents of the University of Minnesota, Minneapolis, MN (US)

(72) Inventors: M. Imran Hayee, Duluth, MN (US); Muhammad Faizan, Duluth, MN (US); Shah Hussain, Duluth, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 45 days.

(21) Appl. No.: 16/212,044

(22) Filed: Dec. 6, 2018

(65) Prior Publication Data
US 2019/0186948 A1 Jun. 20, 2019

Related U.S. Application Data

(60) Provisional application No. 62/599,496, filed on Dec. 15, 2017.

(51) Int. Cl.
*B60Q 9/00* (2006.01)
*B62D 15/02* (2006.01)
*G01C 21/36* (2006.01)

(52) U.S. Cl.
CPC .......... *G01C 21/3697* (2013.01); *B60Q 9/00* (2013.01); *B62D 15/025* (2013.01)

(58) Field of Classification Search
CPC ........ B62D 15/025; B60Q 9/00; B60Q 9/008; G01C 21/3697
USPC .......................................................... 701/41
See application file for complete search history.

(56) References Cited

U.S. PATENT DOCUMENTS

| | | | |
|---|---|---|---|
| 5,337,243 A * | 8/1994 | Shibata | G06G 7/78 342/357.57 |
| 5,790,403 A | 8/1998 | Nakayama | |
| 2007/0032245 A1 | 2/2007 | Alapuranen | |
| 2010/0211235 A1* | 8/2010 | Taguchi | B60T 8/174 701/1 |

(Continued)

FOREIGN PATENT DOCUMENTS

| | | | | |
|---|---|---|---|---|
| JP | 2007095038 A | * | 4/2007 | G08G 1/163 |
| JP | 2019038289 A | * | 3/2019 | |

OTHER PUBLICATIONS

Aashto, The Voice of Transportation, Driving Down Lane-Departure Crashes, 34 pages, 2008.

(Continued)

*Primary Examiner* — Abby Y Lin
*Assistant Examiner* — Hossam M Abd El Latif
(74) *Attorney, Agent, or Firm* — Theodore M. Magee; Westman, Champlin & Koehler, P.A.

(57) ABSTRACT

A method includes accessing information stored for positions along a road and using the accessed information to identify an expected trajectory for a vehicle. Position information for the vehicle is received from a global positioning system for two different time points and is used to determine a trajectory of the vehicle. The trajectory of the vehicle and the expected trajectory are used to determine a lateral offset of the vehicle from the expected trajectory and the lateral offset is used to determine when to issue a lane departure warning for the vehicle.

13 Claims, 16 Drawing Sheets

(56) References Cited

U.S. PATENT DOCUMENTS

| | | | | |
|---|---|---|---|---|
| 2011/0320163 | A1* | 12/2011 | Markkula | B60W 40/072 |
| | | | | 702/150 |
| 2017/0219714 | A1* | 8/2017 | Jordens | G08G 1/0112 |
| 2017/0227364 | A1* | 8/2017 | Miura | G01C 21/30 |
| 2018/0257647 | A1* | 9/2018 | Jurca | B60W 30/0956 |

OTHER PUBLICATIONS

Allen et al., Relating local vision measurements to global navigation satellite systems using waypoint based maps, Position Location and Navigation Symposium (PLANS), 2010 IEEE/ION, pp. 1204-1211.
Alexander et al., Safetruck: Sensing and Control to Enhance Vehicle Safety, Final Report, Chapter 2, No. 2.4, pp. 15-16, 1997.
An et al., A novel approach to provide lane departure warning using only one forward-looking camera, pp. 356-362, IEEE 2006.
Bajikar et al., Evaluation of In-Vehicle GPS-Based Lane Position Sensing for Preventing Road Departure, Intelligent Transportation System, pp. 397-402, 1997.
Banaeiyan et al. Visual warning system for workers' safety on roadside work zones, Proceedings of Transportation Research Board's 95th Annual Meeting, 45 pages, 2016.
Bevly, GPS and its use for vehicle control, GPS and Vehicle Dynamics Lab, https://www.gps.gov/governance/advisory/meetings/2016-05/bevly.pdf, 27 pages, 2016.
Clanton et al., A Low-Cost Solution for an Integrated Multisensor Lane Departure Warning System, IEEE Transactions an Intelligent Systems, vol. 10, No. 1, pp. 47-59, 2009.
Cook et al., Relative accuracy of rectifications using coordinates determined from maps and the global positioning system, Photogrammetric Engineering and Remote Sensing, vol. 62, No. 1, pp. 73-77, 1996.
Eckl et al., Accuracy of GPS-derived relative positions as a function of interstation distance and observing-session duration, Journal of Geodesy, vol. 75, pp. 633-640, 2001.
Farrell et al., Differential GPS Reference Station Algorithm-design and Analysis, IEEE Transactions on Control Systems Technology, vol. 8, No. 3, pp. 519-531, 2000.
Glennon et al., Safety and Operational Considerations for Design of Rural Highway Curves, Report No. FHWA/RD-86-035, Federal Highway Administration, 64 pages, 1985.
GPS, Global Positioning System Standard Positioning Service Performance Standard, 4th Edition, 160 pages 2008.
Hsiao et al., A portable real-time lane departure warning system based on embedded calculating technique, 2982-2986, 2006.
Hsiao et al., A portable vision-based real-time lane departure warning system: day and night, IEEE Transaction on Vehicular Technology, vol. 58, No. 4, pp. 2089-2094, 2009.
Hsiao et al., An embedded lane departure warning system, IEEE 15th International Symposium on Consumer Electronics, pp. 162-165, 2011.
Hussain et al., Real-time relative lane and position identification of surrounding vehicles using GPS and DSRC based vehicle-to-vehicle communication, 15 pages, 2017.
Ibrahim et al., Hybrid work zone information system with portable changeable message signs and dedicated short-range communication, Journal of the Transportation Research Board, No. 2380, pp. 29-35, 2013.
Brahim et al., Development of a Freeway Queue Detection and Warning System using Ad-hoc Control and DSRC based V2V Communication, Bentham's Journal on Recent Advances in Communication and Networking Technologies, vol. 4, No. 2, pp. 103-116, 2016.
Jung et al., A lane departure warning system based on a linear-parabolic lane model, IEEE Intelligent Vehicles Symposium, pp. 891-895, 2004.
Jung et al., A lane departure warning system using lateral offset with uncalibrated camera, IEEE Conference on Intelligent Transportation System, pp. 348-353, 2005.
Kwon et al., Experiments on decision making strategies for a lane departure warning system, International Conference on Robotics and Automation, 2596-2601, 1999.
Lee, A machine vision system for lane-departure detection, Computer Vision and Image Understanding, vol. 86, 52-78, 2002.
Leng et al., Vision-Based Lane Departure Detection System in Urban Traffic Scenes, 11th International Conference on Control, Automation, Robotics and Vision pp. 1875-1880, 2010.
Lin et al., Real-Time Lane Departure Detection Based on Extended Edge-Linking Algorithm, Computer Research and Development, Second International Conference, pp. 725-730, 2010.
Linder et al., Multi-channel lidar processing for lane detection and estimation, Proceedings of the 12th International IEEE Conference on Intelligent Transportation Systems, pp. 202-207, 2009.
Maitipe et al., Vehicle-to-Infrastructure Traffic Information system for the Work Zone Based on Dedicated Short-Range Communication, Journal of Transportation Research Board, No. 2243, pp. 67-73, 2011.
Maitipe et al., Vehicle-to-Infrastructure and Vehicle-to-Vehicle Information System in Work Zones, Journal of the Transportation Research Board, No. 2324, pp. 125-132, 2012.
Matosevic et al., Comparison of Accuracy using GPS and low-cost DGPS. IEEE Transactions on Instrumentation and Measurement, vol. 55, No. 5, Oct. 2006, pp. 1677-1683.
McCall et al., Video-based lane estimation and tracking for driver assistance: survey, system, and evaluation, IEEE Transactions on Intelligent Transportation Systems, vol. 7, No. 1, pp. 20-37, 2006.
Morellas et al., Preview Based Control of a Tractor Trailer using DGPS for Preventing Road Departure Accidents, Proceedings of the IEEE Intelligent Transportation Systems Conference, pp. 797-805, 1997.
Peng et al., Acquisition of Relative Trajectories of Surrounding Vehicles using GPS and DSRC based V2V Communication with Lane Level Resolution, In Proceedings of the 3rd International Conference on Vehicle Technology and Intelligent Transport Systems, pp. 242-251, 2017.
Preston et al., Potential Safety Effects of Dynamic Signing at Rural Horizontal Curves, Minnesota Local Road Research Board, 93 pages, 1999.
Salar et al., Camera-based forward collision and lane departure warning systems using SVM, Deparlinent of Electrical Engineering and Computer Science, pp. 1278-1281, 2013.
Saleem et al., Analysis and Mitigation of Tropospheric Error Effect on GPS Positioning Using Real GPS Data. International Journal of Electronics and Electrical Engineering, vol. 2, No. 3, pp. 249-253, 2014.
Wang et al., Centimeter vehicle positioning and lane keeping, Intelligent Transportation Systems, Proceedings. 2003 IEEE, vol. 1, pp. 649-654.
Wang et al., Technical Correspondence, Lane keeping based on location technology, IEEE Transactions on Intelligent Transportation Systems, vol. 6, No. 3, pp. 351-356, 2005.
Yim et al., Three-Feature Based Automatic Lane Detection Algorithm (TFALDA) for Autonomous Driving, IEEE Transactions on Intelligent Transportation Systems. vol. 4, No. 4, pp. 219-225, 2003.
Yu et al., A lane departure warning system based on machine vision, IEEE Pacific-Asia Workshop on Computational Intelligence and Industrial Application, pp. 197-201, 2008.
Zaman et al., Traffic information system to deliver in-vehicle messages on pre-defined routes using DSRC based V2V communication, Journal of Transportation Research Board, No. 2559, pp. 73-80, 2016.

* cited by examiner

REAL-TIME LANE DEPARTURE DETECTION USING MAP SHAPE POINTS AND TRAJECTORY HISTORIES

CROSS-REFERENCE OF RELATED APPLICATION

The present application is based on and claims the benefit of U.S. provisional application Ser. No. 62/599,496, filed Dec. 15, 2017, the content of which is hereby incorporated by reference in its entirety.

This invention was made with State of Minnesota support under 00056662, CON 000000060573 awarded by Minnesota. The State of Minnesota has certain rights in this invention.

BACKGROUND

Satellite-based position systems, such as the Global Positioning System (GPS), receive clock signals from satellites and use the clock signals to identify a position in three-dimensional space. While satellite-based position systems have been used with vehicle navigation systems, current systems are unable to determine what lane of traffic a vehicle is in. This means that satellite-based position systems cannot be used in anti-collision systems on vehicles.

Dedicated Short Range Communication (DSRC) is a short range wireless communication protocol that has been developed specifically for vehicle-to-vehicle or vehicle-to-infrastructure communication. It allows vehicles to communicate with other nearby vehicles and with various infrastructure such as road signs.

Lane departure by a single vehicle on a curved road is a major safety risk. There are some in-vehicle lane departure warning systems available today which are either vision based or use GPS technology. Vision-based systems rely on image processing of pictures of road markings taken by cameras installed on the front of the vehicle. These systems work reliably when road markings are clearly visible, a condition unlikely to be met during adverse weather and variable lighting scenarios. Similarly, there are some lane departure warning systems which use differential GPS receivers with centimeter level accuracy as well as high-resolution road maps. Such systems can work reliably in almost all weather conditions but are very costly to implement.

The discussion above is merely provided for general background information and is not intended to be used as an aid in determining the scope of the claimed subject matter. The claimed subject matter is not limited to implementations that solve any or all disadvantages noted in the background.

SUMMARY

A method includes accessing information stored for positions along a road and using the accessed information to identify an expected trajectory for a vehicle between two of the positions. Position information for a vehicle is received from a global positioning system for two different time points and the position information is used to determine a trajectory of the vehicle. The trajectory of the vehicle and the expected trajectory are then used to determine a lateral offset of the vehicle from the expected trajectory and the lateral offset is used to determine when to issue a lane departure warning for the vehicle.

In accordance with a further embodiment, a vehicle includes a positioning system providing coordinates for positions of the vehicle and a processor using the coordinates for the positions of the vehicle to determine trajectories of the vehicle. The processor also uses information about locations on a road to identify a preferred trajectory for the vehicle and uses differences between the determined trajectories and the preferred trajectory to identify lane departure events.

In accordance with a still further embodiment, a system includes a position system that identifies a position of a vehicle at a series of time points, a memory containing information for locations along a road, and a processor that uses the identified positions of the vehicle to determine a current trajectory for the vehicle at each time point, that uses the information for the locations along the road to determine a preferred trajectory at each time point, and that identifies a lane departure based on a difference between the current trajectory at a time point and the preferred trajectory at the time point.

In accordance with a still further embodiment, a method includes accessing a past trajectory of a vehicle along a road, determining a current trajectory of the vehicle along the road based on position information from a position system and using the past trajectory and the current trajectory to identify lane departures of the vehicle.

In accordance with a still further embodiment, a method includes a first vehicle receiving a trajectory of a second vehicle through vehicle to vehicle communication and the first vehicle determining a current trajectory of the first vehicle based on position information received from a position system. The first vehicle uses the received trajectory for the second vehicle and the current trajectory of the first vehicle to identify a lane departure of the first vehicle.

In accordance with a still further embodiment, a method includes identifying a future preferred trajectory for a vehicle based on information for locations along a road the vehicle is traveling along. A determination is then made that the current speed of the vehicle exceeds a recommended speed for the future preferred trajectory and in response, an alert to reduce the speed of the vehicle is issued.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION OF ILLUSTRATIVE EMBODIMENTS

Figure 1:
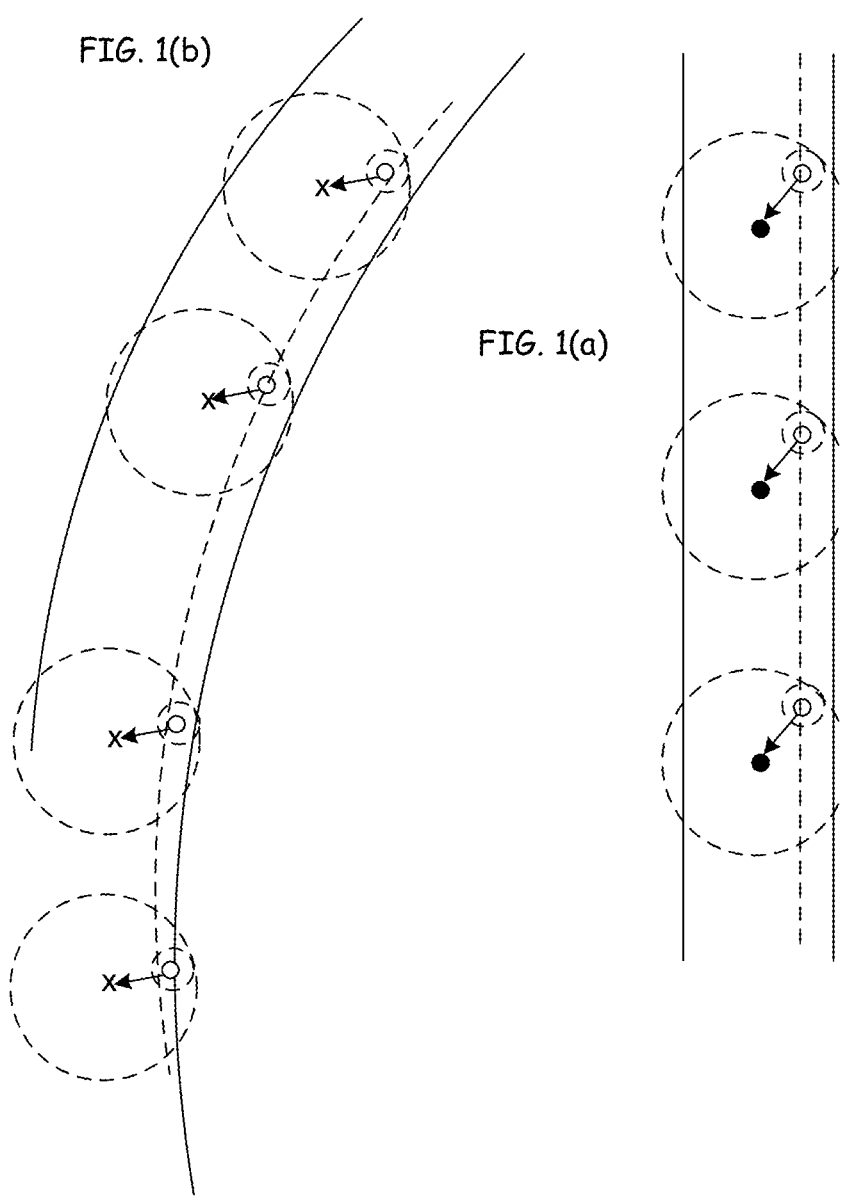
FIG. 1(a) is a conceptual diagram showing relative GPS accuracy versus absolute position accuracy for a straight and (b) a curved road.
FIG. 1(b) is a conceptual diagram showing relative GPS accuracy versus absolute position accuracy for a curved road.

In accordance with one embodiment, GPS technology is utilized to detect lane departure. Generally, absolute position accuracy of an ordinary GPS receiver is in the range of 3-5 m, which is not sufficient to determine any lateral lane-level drift in a vehicle's trajectory needed for lane departure detection. However, the relative GPS accuracy is much higher and can be used for determining relative trajectory of a single vehicle. This concept is illustrated in FIG. 1, where a few adjacent GPS coordinates of a fast moving vehicle taken by a 10 Hz GPS receiver are shown as dots in (a) for a straight road and in (b) for a curved road. The true positions of the vehicle are shown as x's in the center of the large circle dashes but because of the GPS error, the GPS estimated location of the vehicle could be anywhere in the bigger dashed circle. However, the bulk of GPS error is caused by atmospheric disturbances and will remain the same for all adjacent GPS estimated positions because atmospheric disturbances will remain constant over a wide area. As a result, subtracting one GPS estimated position from an adjacent GPS estimated position will give a trajectory value that does not contain the common atmospheric disturbance error. Instead, the trajectory value will only contain a residual GPS error due to device specific sources and confined to smaller dashed circles as shown in FIG. 1. Additionally, in the absence of any multipath interference, most of the device specific error will also not change much over adjacent GPS readings because adjacent readings are taken by the same GPS receiver within a short period of time producing a relative GPS error comparable to that of the differential GPS receiver. Therefore, the relative trajectory acquired by an ordinary GPS receiver turns out to be accurate enough to determine lateral drift due to lane departure.

Figure 2:
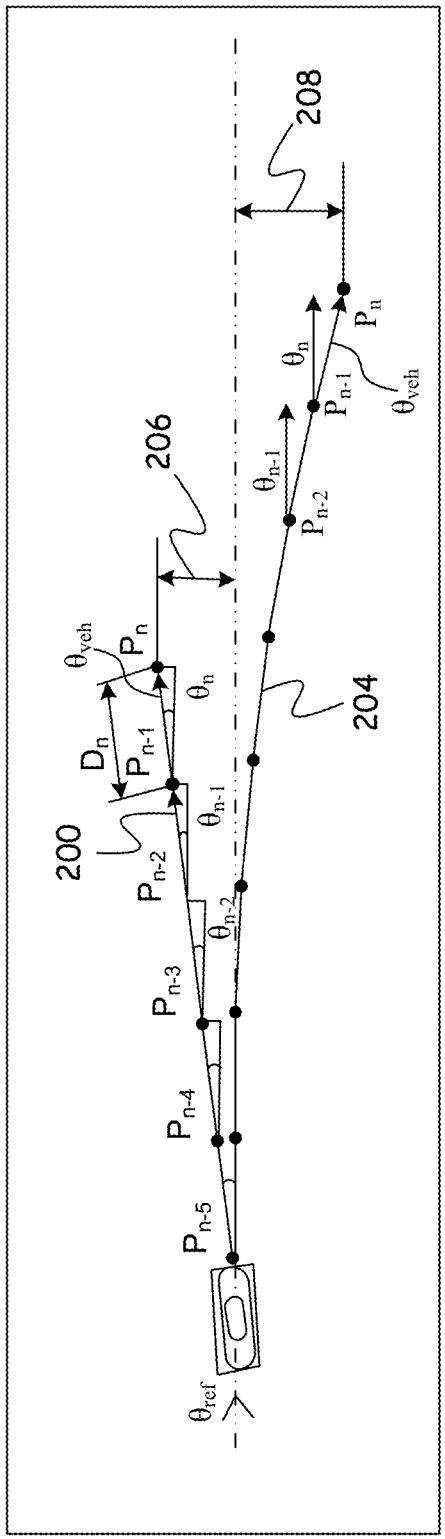
FIG. 2 is a typical trajectory of a vehicle with constant yaw angle and another vehicle with constant steering angle.

Lane Departure Detection:

Lane departure can be categorized by the vehicle drifting away from its lane. There are many ways a vehicle can drift away. Most commonly, a vehicle can drift due to a constant yaw angle or a constant steering angle as shown in FIG. 2 where the top trajectory 200 is due to a constant yaw angle and the bottom trajectory 204 is due to a constant steering angle. Both yaw and steering angles result in the vehicle drifting away from its lane and consequently the lateral distance of the vehicle with respect to its expected trajectory increases. Our proposed system measures the lateral distance and if the accumulative lateral distance is beyond a certain threshold, it issues a lane departure warning. To estimate the lateral distance, the expected direction of travel or expected trajectory is needed which will be called $\theta_{ref}$ herein.

The reference heading or angle on any given road, $\theta_{ref}$, can be taken from Google maps or any other mapping database e.g., OpenStreetMap, by writing an application programming interface (API). Usually, all commonly available navigation devices have the shape points of a road which can provide the necessary $\theta_{ref}$ values needed for the various embodiments. Typically, road segments are represented in the map databases as several segments of individual links, each having unique characteristics such as speed limits, road curvature, number of lanes etc. These links have an associated link identification that are globally unique in the map databases and are the fundamental entity in identifying and processing any given road segment. Additionally, road segments with unique IDs are connected to the immediate neighbor road segments like a chain and have a table of neighbor links and their corresponding IDs stored. Map databases can provide road level or lane level information based on the quality of the survey and required services. The various embodiments do not require lane level information (high resolution maps), only road level information, which is usually available in almost all commonly available navigational device systems. A road level map of a given road segment with a unique global ID has an associated set of geographic Latitude-Longitude points placed somewhere in the middle of the road, which represent the shape of the actual physical road with some lateral error. These shape points do not have to be in the same lane as the vehicle for the present embodiments to function. These shape points are sparse if the road is straight and are dense whenever the road has curvature, for the obvious reason that a curved road will require more shape points to more accurately represent the road shape. The distribution of these shape points on a given road is directly proportional to how acute the road geometry is along that road segment.

With each update in the GPS coordinates of the vehicle, a new lateral distance is computed representing the lateral movement of the vehicle relative to the lane during the period between the previous GPS measurement and the current GPS measurement.

In terms of an equation, the lateral distance computed for each GPS measurement is computed as:

$$\text{Lateral Distance} = \frac{\text{Speed}}{\text{GPS Frequency}} \sin \theta_N$$

where $\theta_N = \theta_{veh} - \theta_{ref}$ and Lateral Distance is the lateral movement of the vehicle relative to the lane between GPS measurements, Speed is the speed of the vehicle, GPS Frequency is the frequency of GPS measurements, $\theta_n$ is a deviation angle between a heading of the vehicle, $\theta_{veh}$ and the reference heading, $\theta_{ref}$, for the current segment of the road and the heading of the vehicle and the reference heading are angles relative to some initial or base heading. In accordance with one embodiment, the heading of the vehicle is determined by taking the difference between the last two measured GPS positions of the vehicle.

Note that the deviation angle can be positive or negative resulting in positive lateral distances for deviations to the left of the reference heading and negative lateral distances for deviations to the right of the reference heading or vice versa. In this computation, the vehicle is treated as having moved in a straight line between the two GPS coordinates and not along a curved line between the two GPS coordinates. At high enough GPS measurement frequencies, such as 10 Hz, the error introduced by this treatment when the vehicle in fact moves along a curved line is small enough to be ignored.

The lateral distance determined for each GPS measurement is added to an accumulated lateral distance that is reset to zero whenever it is determined that the vehicle has completed a lane change. For example, for top trajectory 200 of FIG. 2, an accumulated distance 206 would be produced and for bottom trajectory 204, an accumulated distance 208 would be produced. Because lateral movement to the left produce positive lateral distances and lateral movement to the right produces negative lateral distances, balanced motions to the left and right cancel each other out in the accumulated lateral distance. Thus, weaving within a lane will result in little accumulated lateral distance.

Figure 3:
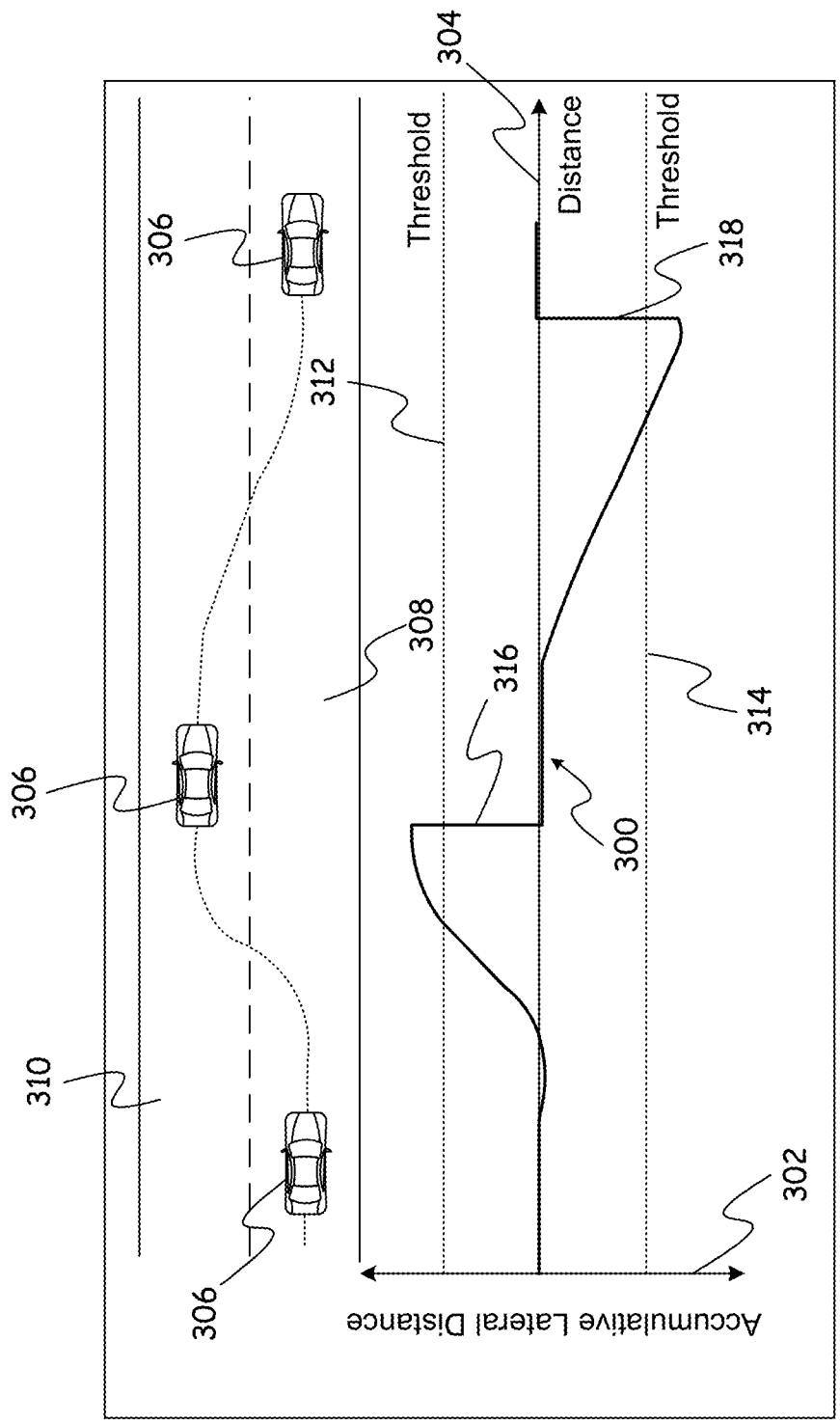
FIG. 3 is a schematic diagram showing a lane departure detection strategy in accordance with one embodiment.

The schematic diagram of lane departure detection is shown in FIG. 3, where a graph 300 of accumulative lateral distance 302 of a vehicle 306 versus distance 304 for a certain time period during which vehicle 306 changes from right lane 308 to left 310 and then comes back to right lane 308. When vehicle 306 changes from right lane 308 to left lane 310, lateral distance 302 increases and when the lateral distance increases beyond a threshold 312 or a threshold 314, vehicle 306 is considered to depart the lane.

Lane departures due to negligence tend to have continuously changing accumulative lateral distances as the driver either weaves relative to the road's trajectory or consistently departs from the road's trajectory in one direction. When the driver weaves relative to the road's trajectory, the accumulative lateral distance varies continuously from positive to negative. When the driver consistently departs from the road's trajectory in one direction, the accumulative lateral distance keeps increasing or decreasing depending on the direction of departure. However, when vehicle 306 is deliberately moved relative to the road's trajectory, the accumulative lateral distance changes for a brief period and then is held relatively constant again. For example, if the driver swerves around an obstacle in the road, the accumulative lateral distance will change for a brief period of time but then will become relatively constant again. Similarly, if the vehicle changes lanes, the accumulative lateral distance will change during the lane change but then will remain relatively constant.

In accordance with one embodiment, when the lateral distance remains relatively constant for a period of time, the accumulative lateral distance is reset to zero so that the thresholds 312 and 314 can once again be used to detect a lane departure. In accordance with one such embodiment, the accumulative lateral distance is reset to zero when five consecutive lateral distance values are each below a set threshold. In the exemplary trajectory of FIG. 3, the accumulative lateral distance is reset to zero at points 316 and 318, which are associated with vehicle 306 completing its lane change from right to left and then again from left to right. In the case of a deliberate lane change, a warning should only be issued when the lane change signal is not activated. However, in the case of a lane departure due to drowsiness or some other negligence, the warning is issued whenever the accumulative lateral distance increases beyond a certain threshold and the warning remains active until the direction of travel becomes sufficiently parallel to the expected direction of travel i.e., $\theta_{ref}$. This lane detection strategy requires an accurate $\theta_{ref}$ and a careful choice of accumulative distance thresholds. Both these aspects are further discussed below.

Accuracy of $\theta_{ref}$:

The accuracy of $\theta_{ref}$ affects the accuracy of detecting lane departure in the embodiments. Ideally, for a straight section of the road, $\theta_{ref}$ should remain constant throughout the straight section but in any practical mapping database, there will be some lateral deviation of the points resulting in $\theta_{ref}$ deviating from one segment (formed by two consecutive shape points) to another. For example, in FIG. 4(a), a straight road segment 400 has shape points 402, 404, 406, 408 and 410, which produce a sequence of reference headings ($\theta_{ref}$) 414, 416, 418 and 420 that each deviate from direction 412 of road segment 400. To reduce the discrepancies between the shape point-based reference headings 414, 416, 418, and 420, and the true heading 412 of the road segment, the individual shape point-based reference headings are replaced by an average 422 of those reference headings. Average heading 422 is a sufficiently accurate representation of the true heading of the road segment as long as the lateral error in $\theta_{ref}$ of any given segment with respect to $\theta_{ref}$ in the previous segment is less than half of the lane width. However, if the lateral error in some of the database points is more than half of the lane width, those points are considered spurious and are skipped in calculating path average $\theta_{ref}$. For example, point 408 is laterally separated from point 406 by more than half a lane width and is therefore excluded from the calculation of average heading 422. This results in headings 418 and 420 being removed from average heading calculation and heading 419 being used in their place. Note that the average heading can be determined using shape points in a different lane than the vehicle is traveling in as long as the average heading 422 is parallel to the lane that the vehicle is traveling in.

Figure 4:
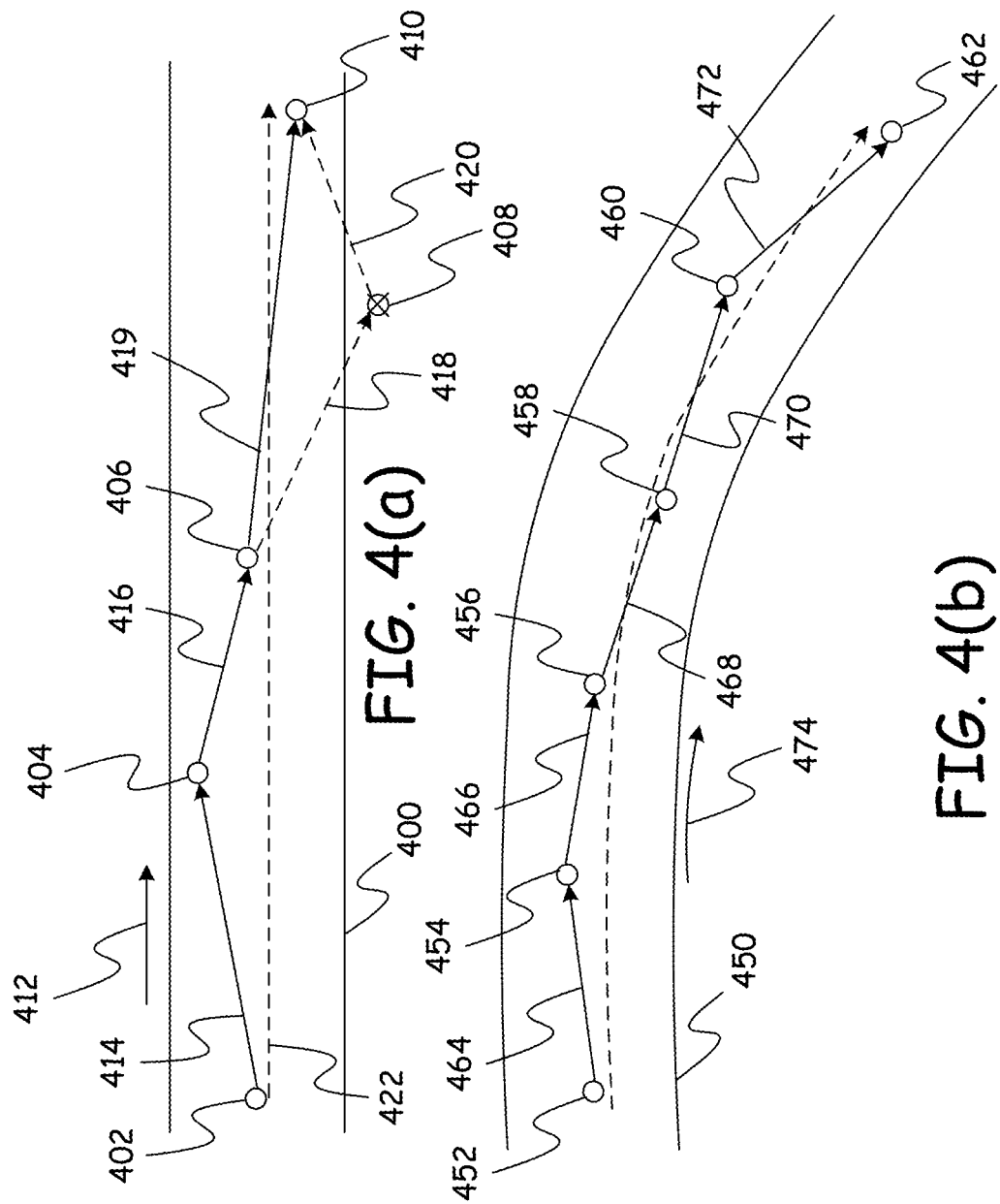
FIG. 4(a) is a schematic geometry showing shape points for a typical straight road segment along with the path average heading used as a reference heading.
FIG. 4(b) is a schematic geometry showing shape points for a typical curved road segment along with the path average heading used as a reference heading.

A similar technique is used to minimize the lateral error in $\theta_{ref}$ for curved road segments. As shown in FIG. 4(b), a curved road segment 450 has shape points 452, 454, 456, 458, 460 and 462, which produce a sequence of reference headings ($\theta_{ref}$) 464, 466, 468, 470 and 472 that each deviate from the curved shape 474 of road segment 450. To reduce the discrepancies between the shape point-based reference headings 464, 466, 468, 470 and 472, and the true heading 474 of the road segment, the individual shape point-based reference headings are replaced by a uniformly-changing $\theta_{ref}$ that best fits the shape point-based reference headings 464, 466, 468, 470 and 472. In other words, a function for the heading is selected to minimize the overall lateral error between the selected function and the shape point-based reference headings.

In accordance with one embodiment, the uniformly-changing $\theta_{ref}$ is determined by forming an average difference between successive reference headings calculated from the shape points. Thus, for each shape point in the plurality of shape points associated with a curved segment of road, a direction from that shape point to the next shape point along the road is determined. This forms the sequence of individual reference headings such as reference headings 464, 466, 468, 470 and 472 of FIG. 4(b). For each shape point, a difference between the direction determined for the shape point and the direction determined for the next shape point along the road is determined. Thus, this involves determining the difference between heading 464 and heading 466 and then determining the difference between heading 466 and heading 468 and so forth. These differences in the headings/directions are then averaged to determine an average change in the expected trajectory across the plurality of positions/shape points. The expected trajectory is then computed separately for each shape point by adding the average change in the expected trajectory to the current value of the expected trajectory. Thus, the expected trajectory changes by the average change amount at each shape point. Note that the reference or expected trajectory does not have to be based on shape points in the same lane that the vehicle is traveling in as long as the reference trajectory follows the contour of the lane that the vehicle is traveling in.

Figure 5:
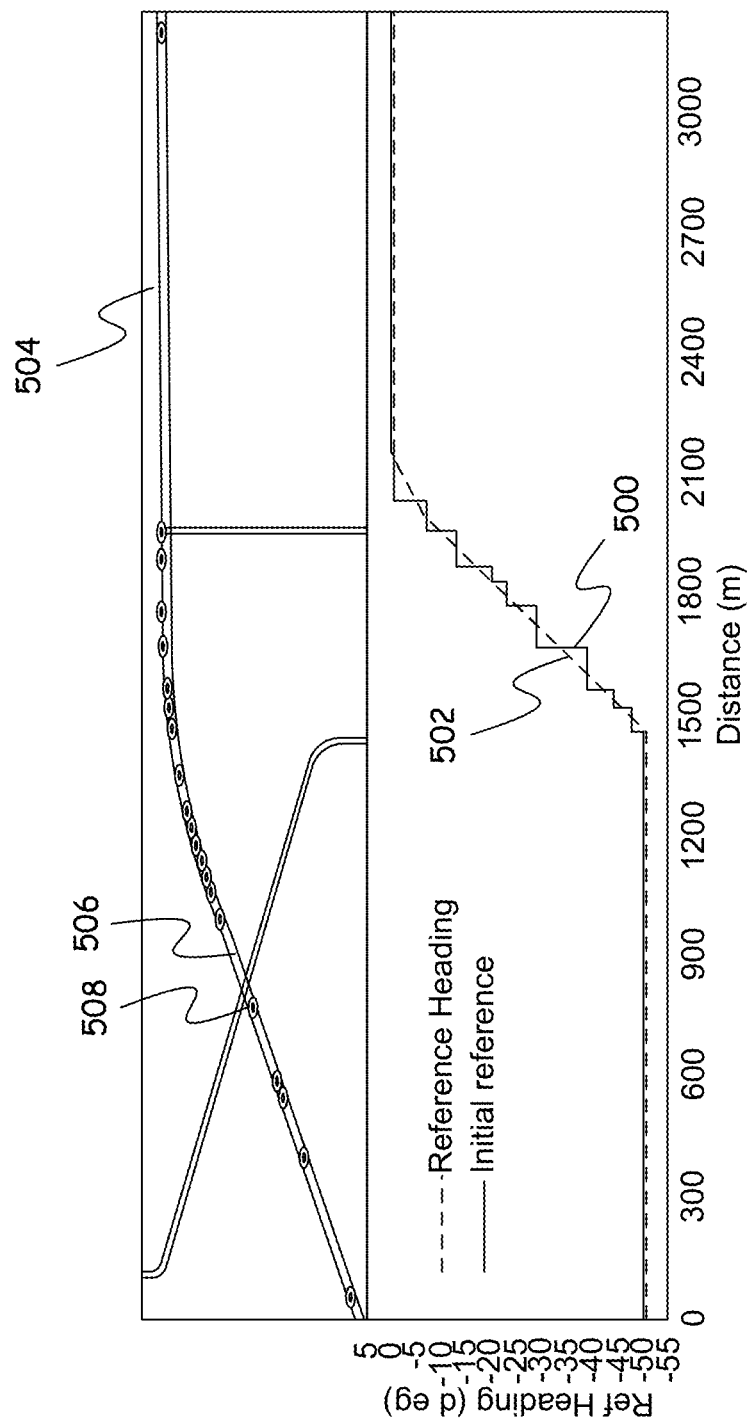
FIG. 5 is a graph of headings between consecutive shape points and calculated heading references for a section of road.

In practical scenarios, a road is a combination of straight sections and curved sections. The above-mentioned strategy works on each individual straight or curved section of any road segment. For example, a common practical scenario is a straight road section followed by a curved section or vice versa. In such cases, $\theta_{ref}$ is considered as the path averaged direction for the straight road sections and path averaged slope is considered to determine $\theta_{ref}$ for the curved sections. An example of this is illustrated in FIG. 5, which provides a graph 500 of shape point-based reference headings as function of distance and a graph 502 of a calculated reference heading as a function of distance using average reference headings for straight road segments and constant slope reference headings for curved segments. In graphs 500 and 502, the angle of the reference heading $\theta_{ref}$ is shown on the vertical axis and distance is shown on the horizontal axis. A map 504 of the road segment 506 associated with graphs 502 and 504 is shown above the graphs and includes shape point markers, such as shape point marker 508, As shown in map 504, road 506 has one curved section surrounded by two straight sections. The density of shape points on the straight road sections is less than the density of shape points on the curved section as expected.

Figure 6:
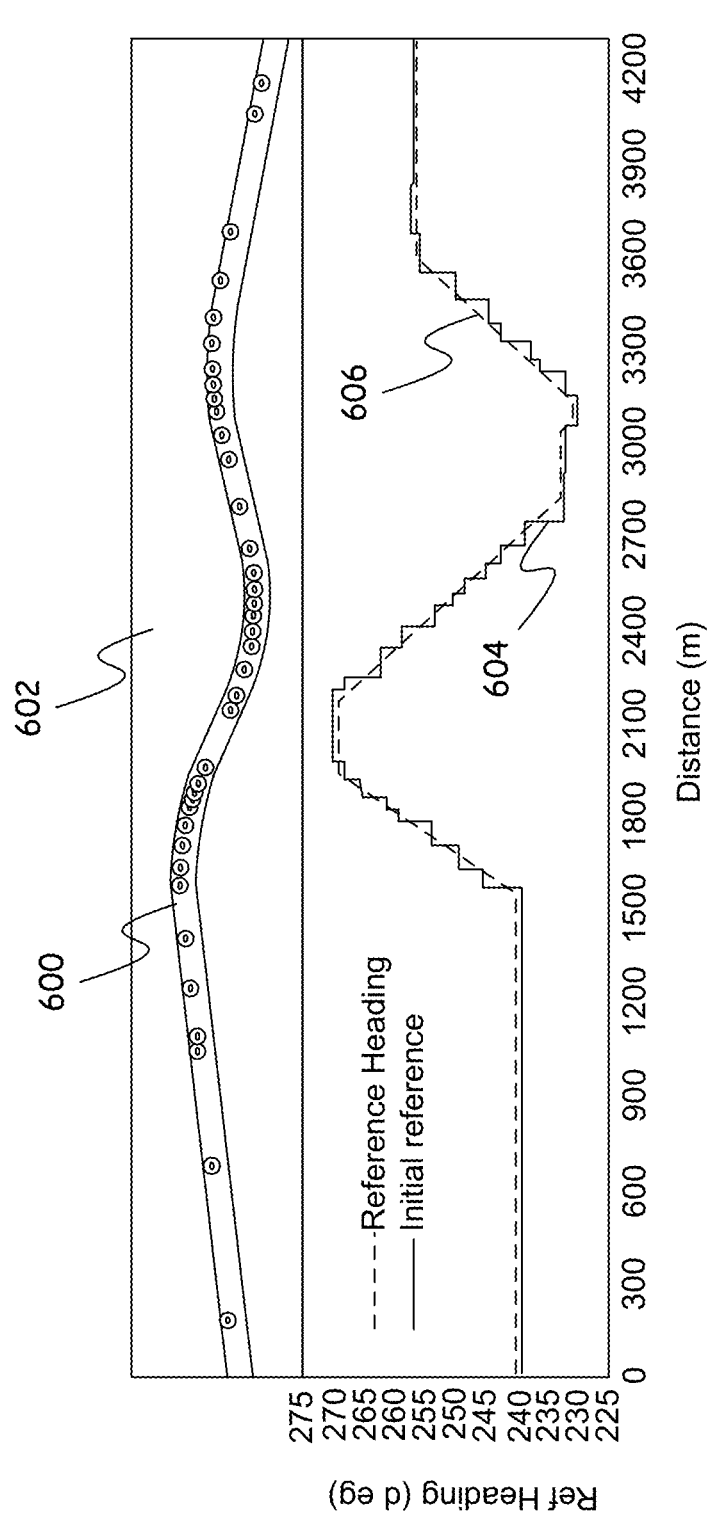
FIG. 6 is a graph of headings between consecutive shape points and calculated heading references for a section of road.

A more complex road segment 600 is shown in a map 602 of FIG. 6, which also shows a graph 604 of shape point-based reference headings as function of distance and a graph 606 of a calculated reference heading as a function of distance using average reference headings for straight road segments and constant slope reference headings for curved segments. In graphs 604 and 606, the angle of the reference heading $\theta_{ref}$ is shown on the vertical axis and distance is shown on the horizontal axis.

Figure 7A:
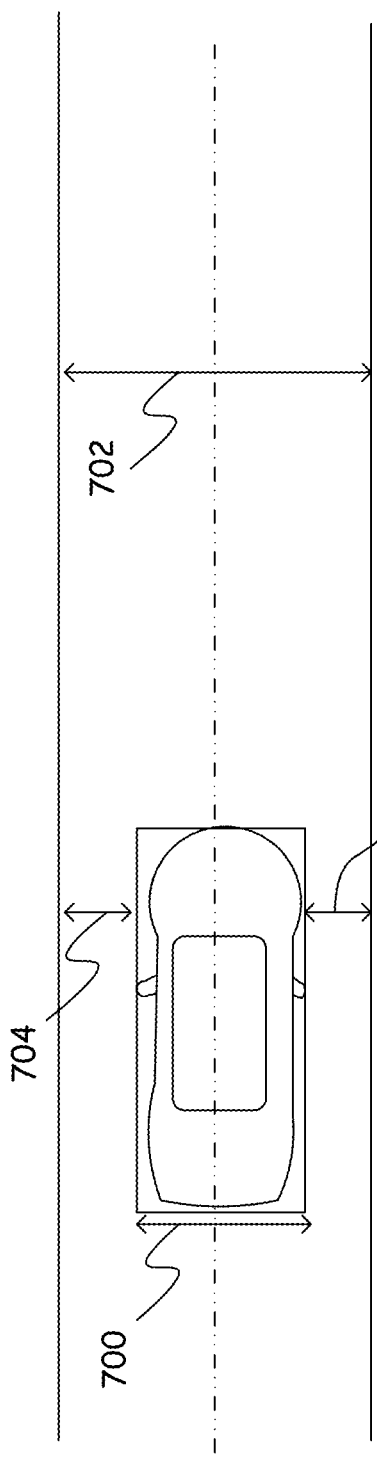
FIG. 7(a) is a schematic geometry showing accumulative lateral distance threshold for lane detection

Threshold:

Once the reference heading $\theta_{ref}$ is determined, it can be used to calculate the accumulative lateral distance of a given vehicle to quantify the lane departure. This quantified amount of lane departure can then be compared to a threshold to determine when to alert the driver that they are leaving their lane. The threshold choice is a balance between safety and the occurrence of false alarms, as a large threshold can minimize false alarms but risks delaying the lane departure warning. In accordance with one embodiment, the accumulative lateral distance threshold is selected to be half of the vehicle width 700 subtracted from half of the lane width 702 as shown in FIG. 7(a). This results in the threshold being equal to the amount of lateral buffer space 704 and 706 between the vehicle and the edges of the lane when the vehicle is centered in the lane. The typical width of the vehicle is from 1.6 to 2.0 m and the lane width is 3.6 m. Therefore, the threshold ranges from 0.8 to 1.0 m in most embodiments. In accordance with one embodiment, the threshold is 1.0 m.

Figure 7B:
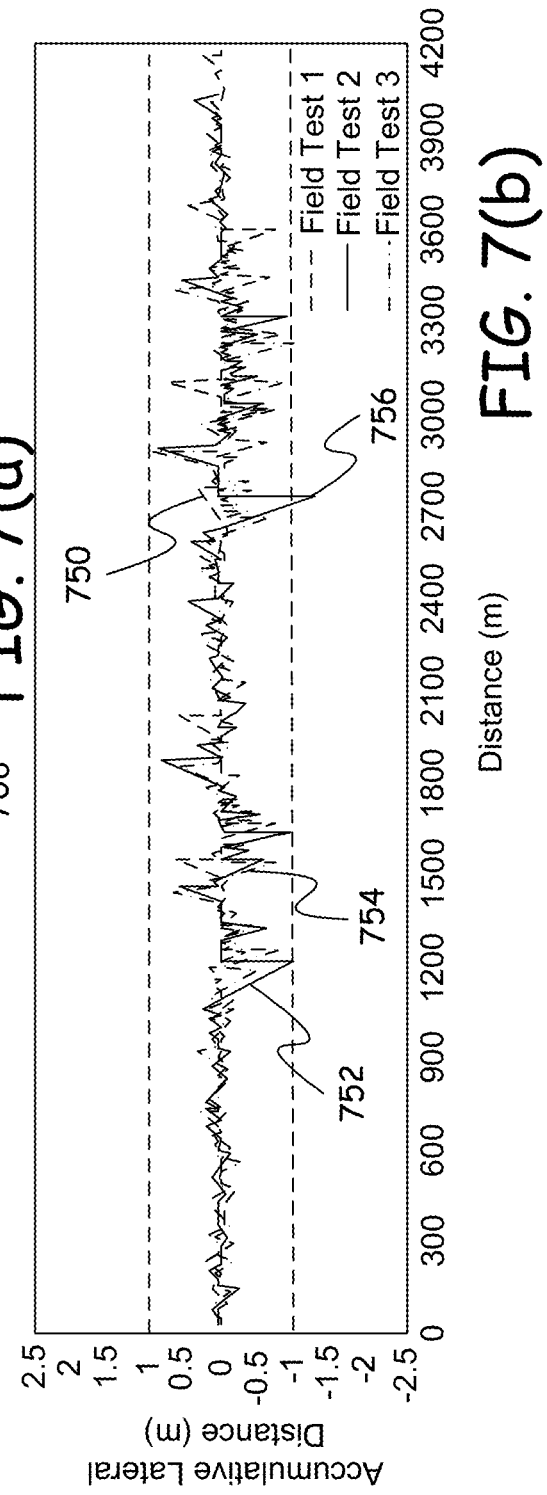
FIG. 7(b) is a graph of accumulative lateral distance for three trials of normal driving verses road distance.

To evaluate if the 1.0 m threshold is reasonable, we drove a vehicle on the highway of FIG. 6 in one lane, three times. Graphs 750, 752 and 754 of FIG. 7(b) show the calculated accumulated lateral distance versus road distance for each of the three trials. Please note that during normal driving, the vehicle may not necessarily travel parallel to the road all the time. It usually travels in a slow zig-zag pattern which results in lateral distance to accumulate in one direction or the other without reaching the threshold. FIG. 7b shows that except once for a short period of time in one of the three trials, the accumulative lateral distance never crossed the threshold as should have been the case in normal driving and whenever the accumulative lateral distance crosses the threshold during normal driving, it results in a false alarm. For the three trials, the accumulated lateral distance only crossed the threshold (1 meter) once for a short period of time at point 756 (around 2,700 m). If the threshold is increased, the probability of the false alarm can be minimized but actual lane departure warnings will be delayed. In our field test trials, a threshold of 1 m was reasonable as it resulted false alarms only a few times (<1% of the time) for very short periods of time, lasting less than a second. Usually, the false alarms almost always occurred at sharp curved sections as discussed in the next section.

Results and Discussion

We implemented our lane detection methodology in Savari's DSRC device and ran many field tests to evaluate it. We ran the tests on a 3 km long section of Rice Lake Road (FIG. 5) as well as 4 km long section of I-35 (FIG. 6). The lane departure was evaluated by changing lanes. We made multiple lane departures on both road sections to evaluate the efficiency of lane departure detection. I-35 is a two lane (one way) road so we used both lanes to depart lanes back and forth. On the other hand, Rice Lake Road was a single lane road with a wide shoulder which we used as a second lane to depart the lane back and forth.

Figure 8:
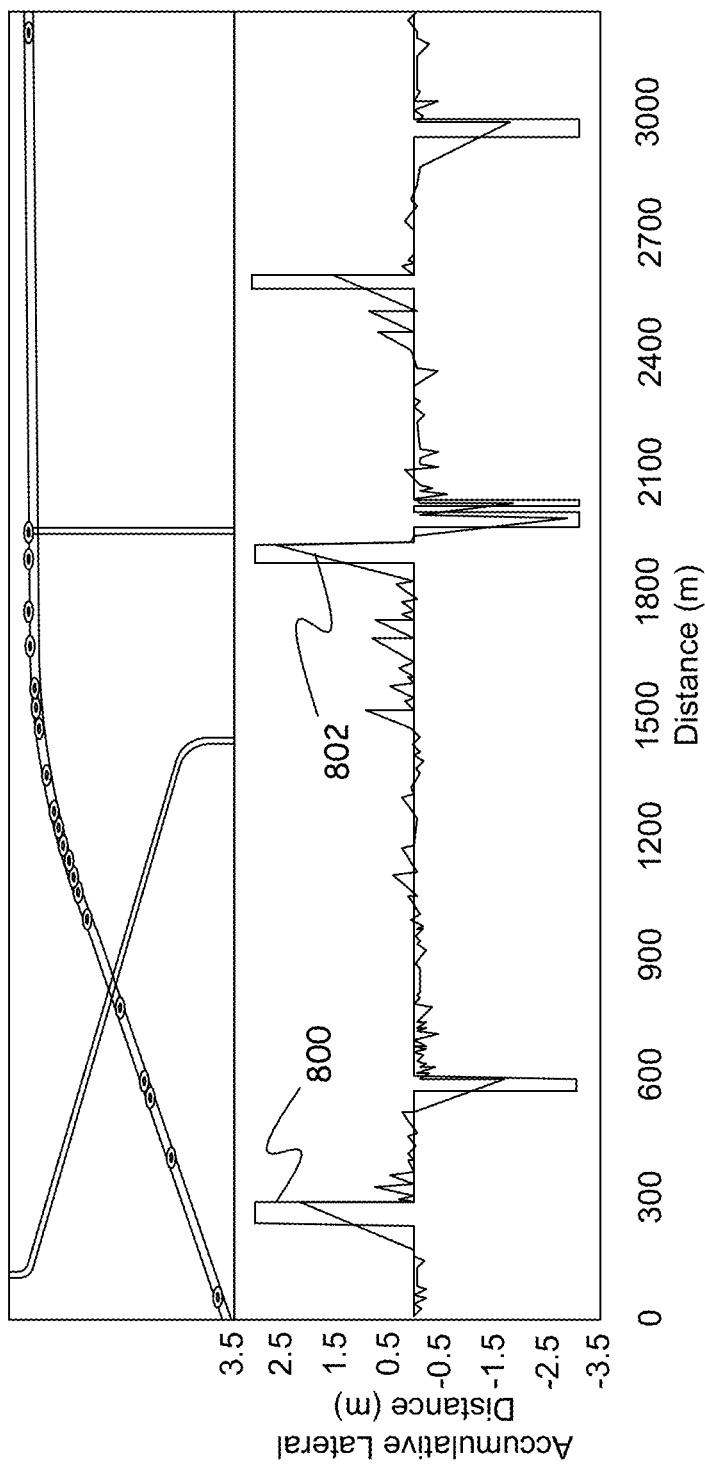
FIG. 8 is a graph of accumulative lateral distance versus road distance for a typical field trial on a section of road.

One typical scenario involving multiple lane departures on Rice Lake Road is shown in FIG. 8 where graph 802 shows accumulative lateral distance versus road distance. Over the length of the 3 km road section, a total of 6 lane departures were made. Two of these six lane departures were made on the curved section of the road. The positive accumulative distance shows the lane drift or lane change on the right side and negative accumulative distance shows the lane drift or lane change on the left side. Each of the 6 times, the lane departure due to lane change was accurately detected and an audible warning signal was issued in real time as soon as the absolute value of accumulative lateral distance increased above 1.0 m. As soon as the lane change was complete, the vehicle's direction of travel became parallel to the road direction i.e., $\theta_{ref}$. At this point, the accumulative lateral distance was reset to zero and the audible warning was turned off. A digital mask 800 of the audible warning signal is superimposed in FIG. 8 showing the duration of lane departure warning due to lane change. If the lane was changed quickly, the audible signal was heard for a short period of time and if the lane was changed slowly, the audible signal was heard for a longer period.

Figure 9:
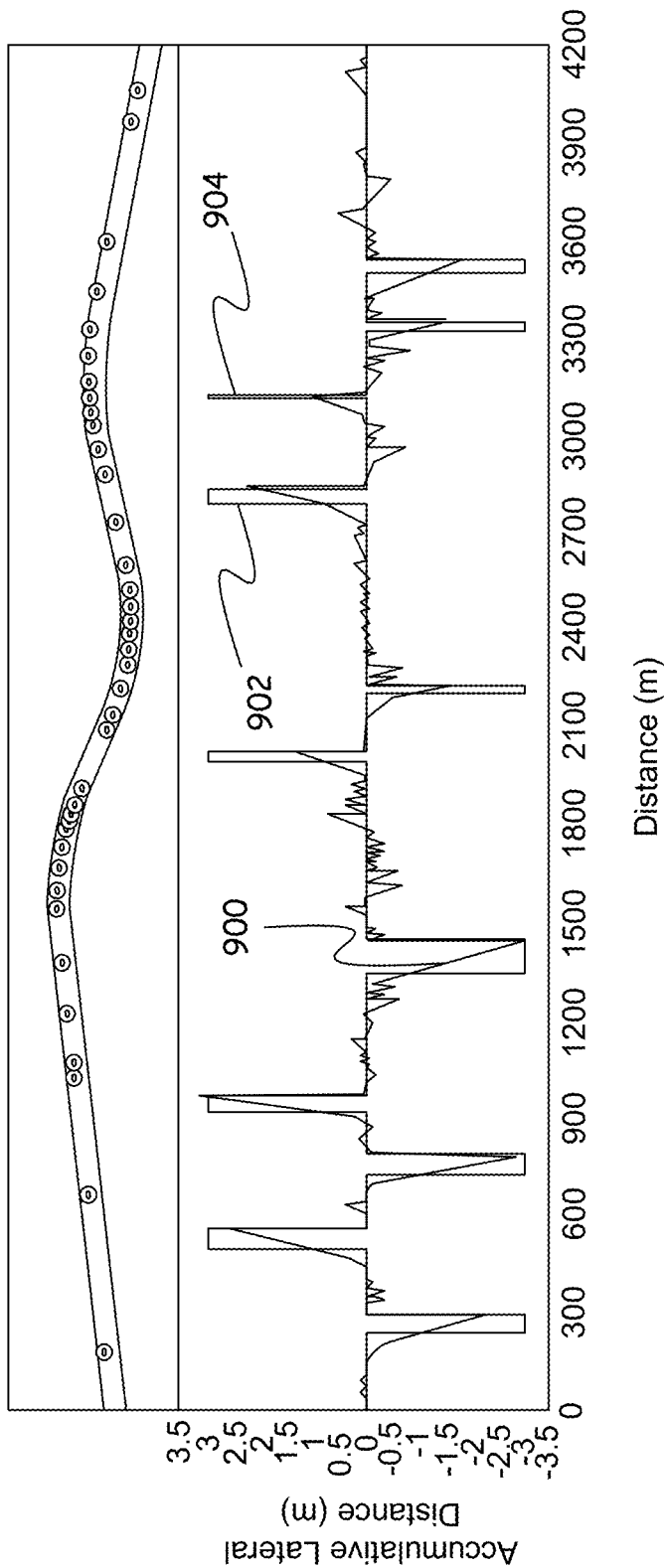
FIG. 9 is a graph of accumulative lateral distance versus road distance for a typical field trial on a section of road.

We repeated similar tests on I-35. Each time, the lane departure warning was accurately detected and an audible warning signal was heard during the lane departure. A few times, there were some false alarms which meant that a lane departure warning was issued but actually there was no lane departure. Once such typical scenario where we noticed false alarm is shown in FIG. 9 where graph 900 shows accumulative lateral distance versus road distance and mask 902 shows when the alarm was triggered. Over the length of four km, a total of nine back and forth lane departures were made by changing lanes back and forth. During all nine cases, a lane departure warning was accurately issued except at point 904 (around 3,100 m), when a false alarm was issued for a brief period (about less than half a second). This was at a sharp curved section of the road. Overall, we repeated the tests many times and false alarms only occurred about 1% of the time for a brief period. We noticed that false alarms mainly occurred at sharp curves especially when a curve was about to start. We also noticed that with this method, we do not miss any real lane departures but risk only false alarms once in a while. The probability of false alarm can be further reduced but that also means that we will delay the lane departure warning which can be dangerous in case of real lane departure due to negligence.

Figure 10:
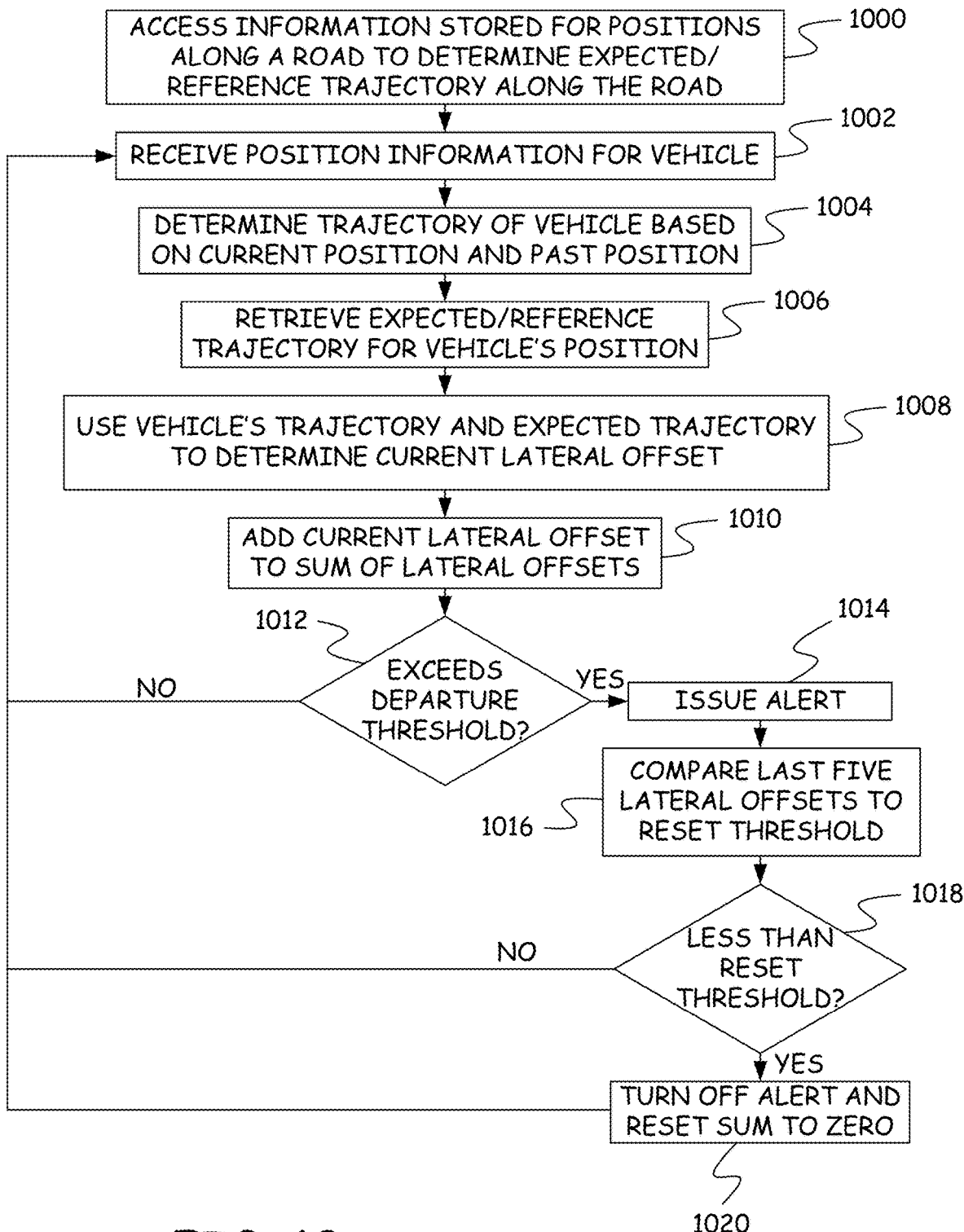
FIG. 10 is a flow diagram of a method in accordance with one embodiment.

FIG. 10 provides a flow diagram of a method of issuing lane departure alerts based on differences between an expected trajectory and a measured trajectory for a vehicle. In step 1000, information stored for positions along a road is accessed to determine an expected/reference trajectory along the road. Such an expected/reference trajectory can be computed as a sequence of individual trajectories formed by taking the difference between the location of successive shape points along the road or can be computed as a sequence of averages of those individual trajectories along straight segments of the road and uniformly changing expected trajectories along curved segments of the road using the techniques described above.

At step 1002, a position of the vehicle is received from the position system. At step 1004, a current trajectory of the vehicle is determined based on the current position and the immediately previous position of the vehicle. At step 1006, the expected/reference trajectory for the vehicle's current position is retrieved from memory. At step 1008, the vehicle's current trajectory and the expected trajectory are used to determine a current lateral offset as discussed above. At step 1010, the current lateral offset is added to a sum of lateral offsets. At step 1012, the sum of lateral offsets is compared to a departure threshold. If the sum of lateral offsets exceeds the departure threshold at step 1012, an alert is issued or continues to be issued at step 1014.

At step 1016, the last five lateral offsets are compared to a reset threshold. If each of the last five lateral offsets are less than the reset threshold at step 1018, the alert is turned off at step 1020 and the lateral offset sum is reset to zero. If the sum of lateral offsets does not exceed the departure threshold at step 1012 or if the last five lateral offsets are not all less than the reset threshold at step 1018 or after step 1020, the process returns to step 1002 to receive new position information for the vehicle.

Figure 11:
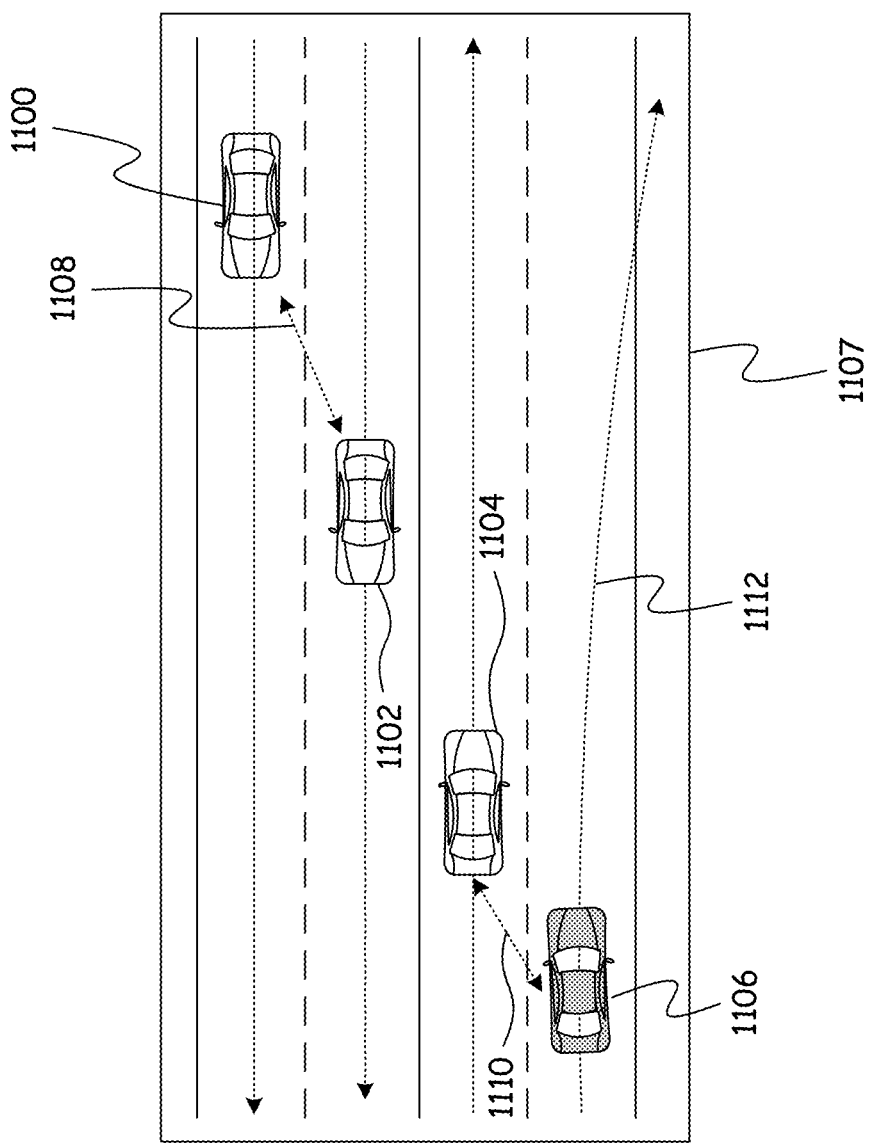
FIG. 11 is a conceptual diagram of lane departure detection system using V2V communication on a straight road.

In a further embodiment, a lane departure warning system is provided where a reference direction of travel is provided by vehicle-to-vehicle (V2V) communication instead of relying on a map database. The concept of a lane departure warning system using V2V communication is depicted in FIG. 11 which shows DSRC equipped vehicles 1100, 1102, 1104 and 1106 traveling on a straight road segment 1107. In a connected vehicle environment, each DSRC equipped vehicle exchanges basic safety messages (BSMs) with neighboring vehicles across communication paths, such as paths 1108 and 1110. Each BSM contains a lot of information about the vehicle including its current position and heading. Therefore, any given vehicle in a connected vehicle environment not only acquires its own trajectory via its own GPS receiver but also obtains the trajectory of the neighboring vehicles via V2V communication. The trajectory provided by one or more neighboring vehicles can serve as a reference direction of travel for any given vehicle and it can help detect a potential lane drift. For example, in FIG. 11, vehicle 1106 traveling towards the right side is shown to drift from its lane along path 1112. This lane drift can be detected using the reference direction 1114 obtained by vehicle 1104 traveling in the same direction in its own lane. Please note that the trajectories of the vehicles traveling on adjacent lanes in the same direction can serve as a reference direction of travel for each other. However trajectories of the vehicles traveling in opposite direction cannot not be used for the same purpose as many roads split in opposite directions and can have very different trajectories especially on freeway sections where opposite direction are separated by grass, trees, hills or dividers.

Figure 12:
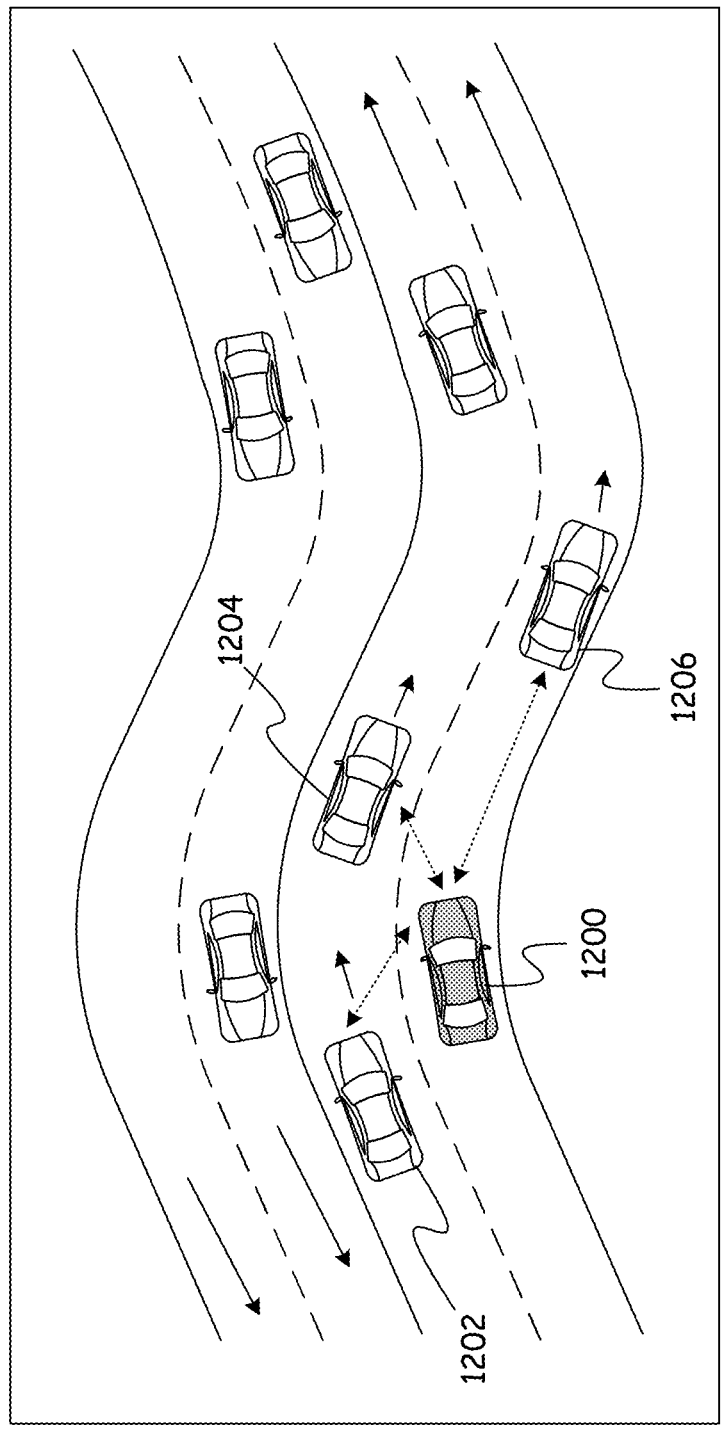
FIG. 12 is a conceptual diagram of lane departure detection system using V2V communication on a curved road.

Using V2V communication, a reference direction of travel can be provided to any given vehicle by only one neighboring vehicle for accurate detection of lateral lane departure as long as the road is straight because the reference direction of travel does not change much for relatively longer distance on a straight road. However, when a road has curves, its reference direction of travel changes over distance and time for any given vehicle. In case of curved roads, the reference direction of travel can still be provided by only one neighboring vehicle as long as it travels in sync with the given vehicle i.e., keeping a short but constant distance from the given vehicle throughout the curve. This condition is hard to be met. Therefore, for accurate detection of lane departure in a given vehicle, it needs to receive reference direction of travel via basic safety messages (BSMs) from multiple neighboring vehicles scattered over a reasonable geographical distance as shown in FIG. 12 in which vehicle 1200 is receiving BSMs from three neighboring vehicles 1202, 1204 and 1206 around it. The locations and headings of the vehicles 1202, 1204 and 1206 around vehicle 1200 of FIG. 12 are sufficient for it to learn about the degree of curvature of the road to accurately detect a potential unintentional lane departure. The DSRC market penetration plays a key role in providing reference direction of travel to any given vehicle on a curved road. While a low market penetration will work for a straight road, a sufficiently large market penetration is needed on a curved road to successfully obtain reference direction of travel to detect a potential lane departure.

Figure 13:
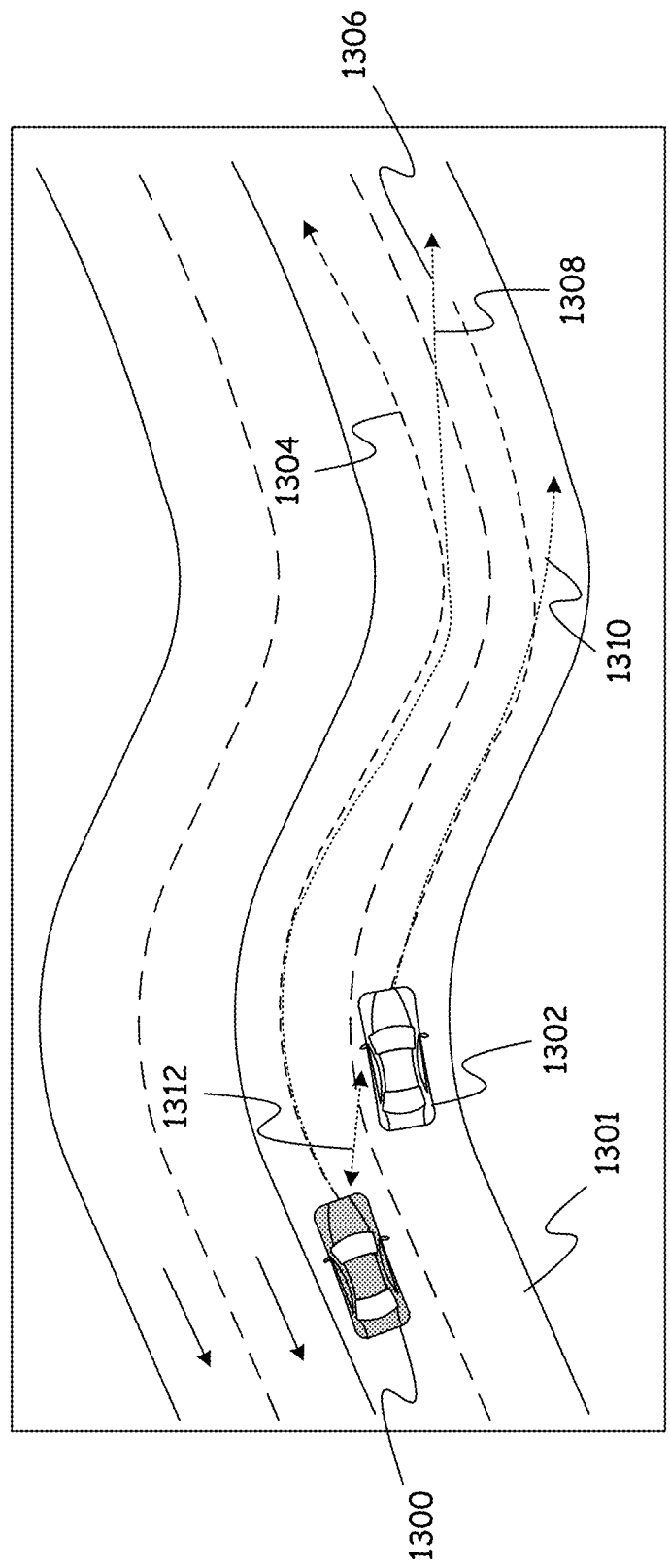
FIG. 13 is a conceptual diagram showing how a recorded past trajectory of a given vehicle can serve as a reference direction of travel.

In accordance with a further embodiment, the reference direction of travel for a given vehicle is obtained from the past history of the vehicle's own recorded trajectory for any given road. If a vehicle has not departed from a lane on a given road in the past, it can use its own previously recorded trajectory for the reference direction of travel to accurately detect a future lane departure due to negligence or drowsiness. For example, in FIG. 13, a vehicle 1300 has driven a road 1301 before and has stored a heading history 1304 in its onboard unit. Using heading history 1304 as a reference heading, vehicle 1300 is able to determine if the vehicle's current heading 1306 diverges from the reference heading indicating a lane departure. Similarly, if vehicle 1302 is traveling on a road for the first time, it can obtain the recorded trajectory 1304 of vehicle 1300 via V2V communication 1312 and use recorded trajectory 1304 as a reference direction of travel 1308 to detect when current heading 1310 diverges from reference heading 1308 enough to indicate a potential unintentional lane departure.

Figure 14:
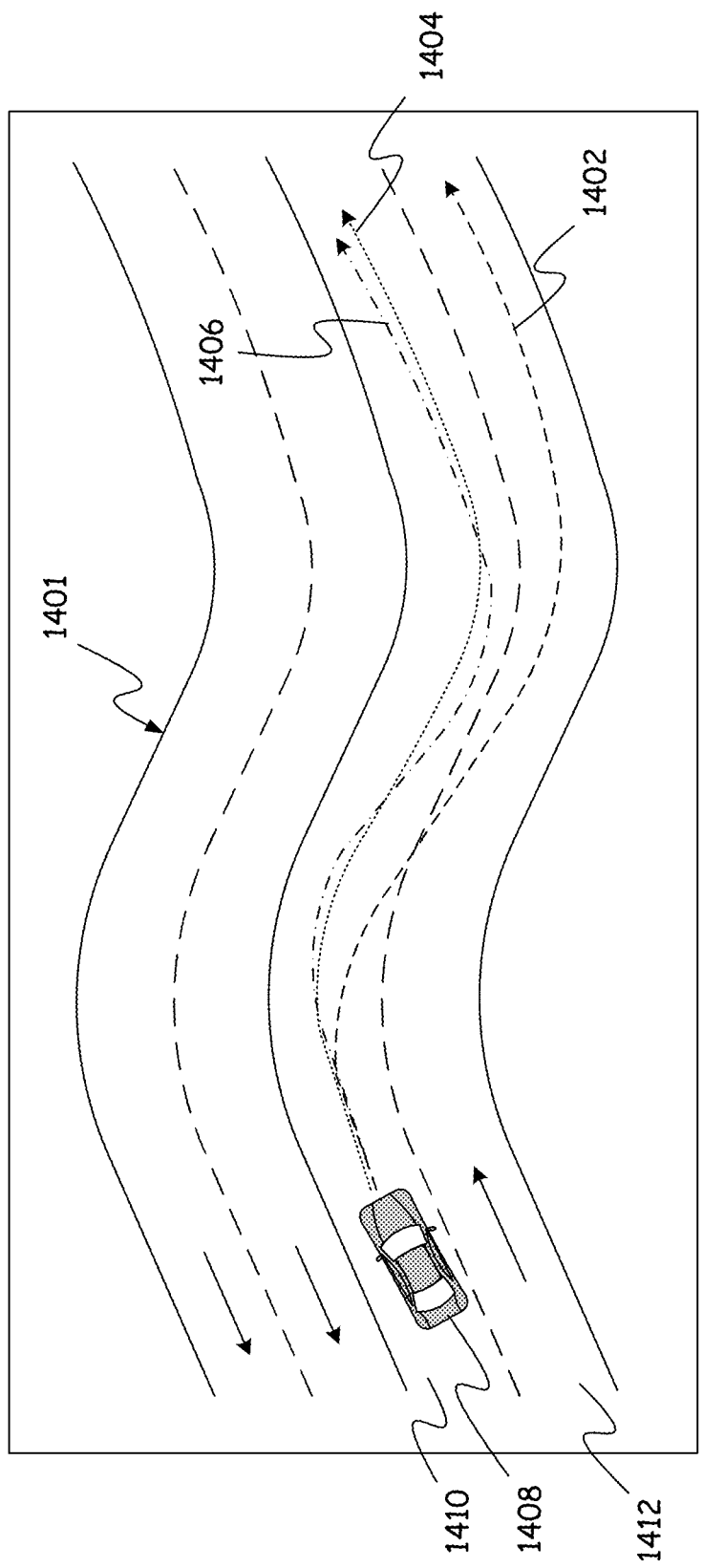
FIG. 14 is a different potential trajectory of a given vehicle during multiple trips on the same road.

Usually, a vehicle will take slightly different trajectories in each new trip on the same road. For example, in FIG. 14, vehicle 1408 has traveled road 1401 three times along three different paths 1402, 1404 and 1406. Path 1402 includes a deliberate lane change from lane 1410 to lane 1412. A more accurate reference direction of travel can be obtained by averaging multiple past trajectories. However, it is important to exclude any lane change of a given vehicle before including that trajectory in average reference direction of travel. Thus, path 1402 would not be included in the average path determination and only paths 1404 and 1406 would be averaged together to form the reference heading.

Using this averaging of past trips of the same vehicle as a reference heading, DSRC market penetration needed for accurate detection of a potential lane departure due to negligence or drowsiness can be reduced to zero if a vehicle is traveling on a frequently traveled road. Similarly, the DSRC market penetration can be reduced to sufficiently small even if it is traveling on a given road for the first time regardless of the degree of curvature of the road.

Figure 15:
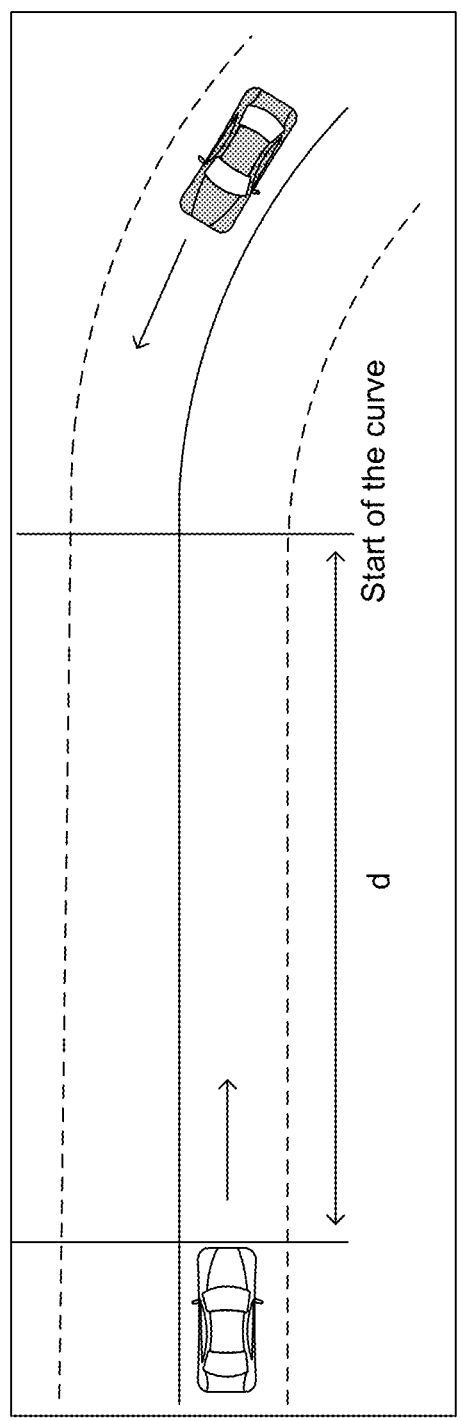
FIG. 15 is a conceptual diagram showing a speed alert for an approaching curve in accordance with one embodiment.

In a further embodiment, drivers are warned ahead of time if they are approaching a sharp curve while driving at a higher speed than recommended for the upcoming curve as shown in FIG. 15. The future road curvature information in the onboard unit is used to issue such a warning. For example, shape points stored in the onboard unit for an upcoming section of road are used to identify the amount of curvature in the road. The speed of the vehicle is updated in real time and the road curvature in front of the vehicle is evaluated periodically to see if a sharp curve is ahead. If so, an advance warning is issued depending upon vehicle's speed, its distance, d, from the start of the curve and the degree of curvature of the upcoming curve. In accordance with one embodiment, an audible signal or vibration alert is used to warn the driver of excess speed. In other embodiments, a visual warning is issued instead of or in addition to the audible or vibration warning.

Figure 16:
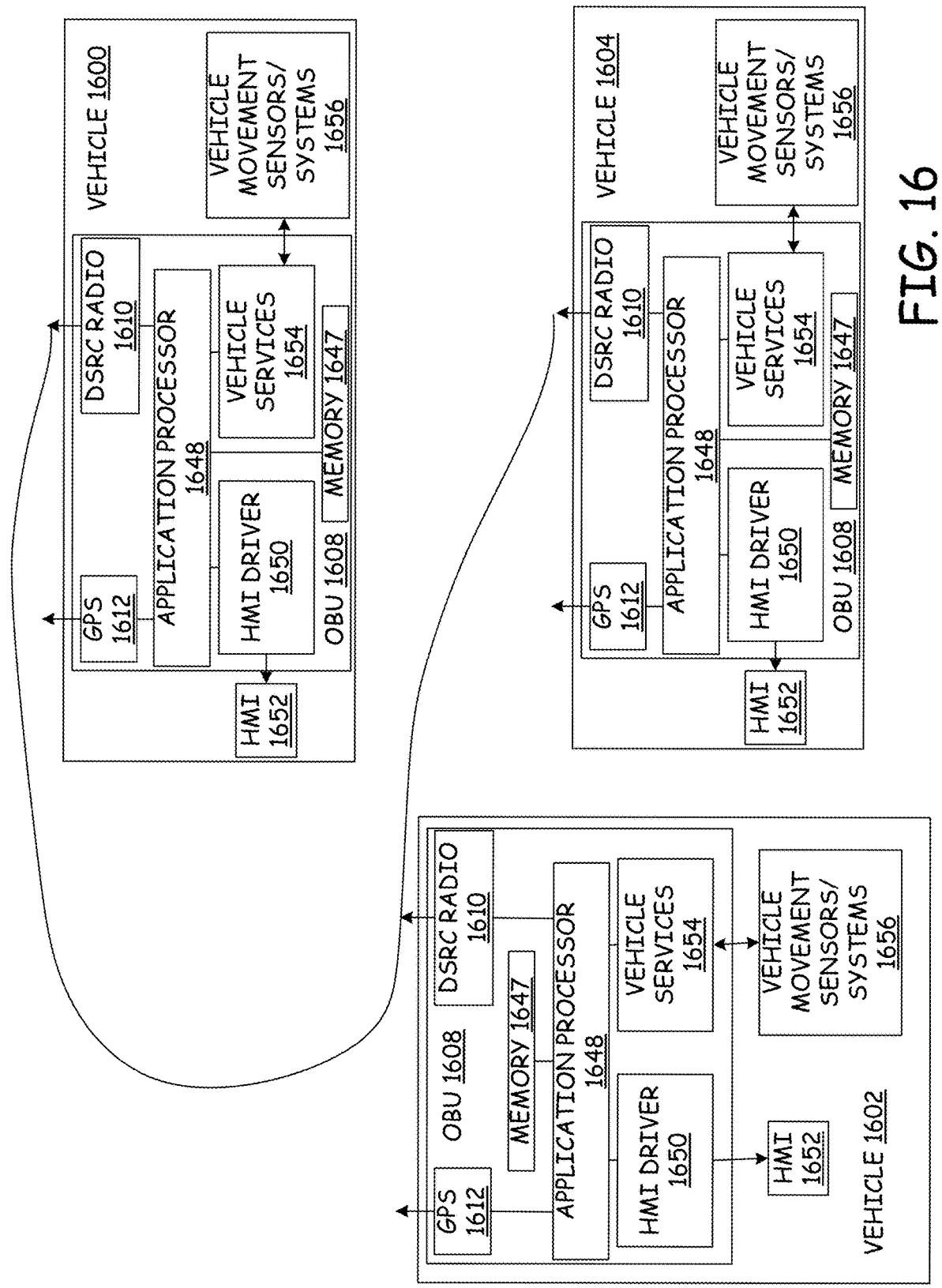
FIG. 16 provides a block diagram of elements used in a system in accordance with one embodiment.

FIG. 16 provides a block diagram of three vehicles 1600, 1602 and 1604, each equipped with a respective onboard unit 1608 that includes a wireless communication radio 1610, which in one embodiment is a dedicated short range communication (DSRC) radio, and a position system 1612, which in one embodiment is a Global Positioning System (GPS) receiver.

Onboard units 1608 also include an application processor 1648 and a memory 1647 where processor 1648 executes instructions stored in memory 1647 to perform a number of functions. For example, application processor 1648 executes instructions that periodically request position coordinates of the respective vehicle from the vehicle's position system 1612. Each obtained set of position coordinates has a degree of accuracy that is a function of the errors present in the determined coordinates including mechanical error, satellite ephemeris error and atmospheric error. In addition, each obtained set of position coordinates includes the time at which the coordinates were determined. The coordinates and their time stamps are stored in memory 1647 so that they can be used to compute a trajectory for the vehicle. Vehicles 1600, 1602, and 1604 also include vehicle movement sensors/systems 1656, which provide information about the vehicle such as the current speed of the vehicle, the status of various vehicle components such as tires, lights, brakes, wipers, and the orientation of the tires, for example. This information is provided to a vehicle services module 1654 in onboard unit 1608, which provides the information to application processor 1648. In addition, some vehicle movement sensors/systems 1656 are able to control the speed and steering of the vehicle based on values received from vehicle services 1654. Each onboard unit also includes a human-machine interface (HMI) driver 1650 that can control a human-machine interface 1652 to provide audible or visual alerts or other information to the driver.

Each of vehicles 1600, 1602, and 1604 can implement the relative lane departure methods described above that rely on maps of shape points to determine a reference heading. In accordance with this embodiment, each onboard unit 1608 is a dedicated short-range communication (DSRC) device. Please note that in many embodiments no vehicle to vehicle (V2V) communication is used even though the DSRC unit is capable of V2V communication. Many embodiments work in any navigational device having a GPS receiver and necessary processing power. In accordance with one embodiment, GPS receiver 1612 acquires GPS data at a frequency of 10 Hz and application processor 1648 makes a decision about lane departure every 100 msec. Once application processor 1648 detects a possible lane departure, a warning via an audible sound, a vibration and/or a visual display is issued through human-machine interface 1652. In accordance with further embodiments, the lane departure warning is provided to an automated steering controller in vehicle movement sensors/systems 1656 that is responsible for maintaining the vehicle in the lane.

In embodiments in which a vehicle uses the trajectories of neighboring vehicles to determine the expected direction for the vehicle, for each obtained set of coordinates, application processor 1648 constructs and transmits a message that includes the position coordinates, the time at which the coordinates were determined and an identifier for the transmitting vehicle using respective radio 1610. The transmitted messages are received by respective radios 1610 in the other vehicles that are within range of transmitting radio 1610. The receiving radios 1610 provide the received message to the receiving radio's respective application processor 1648, which decodes the message to acquire the coordinates, the time stamp and the vehicle identifier transmitted by the transmitting vehicle. The position coordinates received from the transmitting vehicle have the same degree of accuracy as the transmitted coordinates and include the mechanical error, the satellite ephemeris error and the atmospheric error.

Each time an application processor 1648 receives coordinates from another vehicle, application processor 1648 updates relative trajectories of the vehicle that transmitted the coordinates and the vehicle that the application processor 1648 is located in. In one embodiment, the trajectory of the receiving vehicle is updated by determining a difference between previous coordinates of the receiving vehicle provided by onboard positioning system 1612 and the last-determined coordinates of the receiving vehicle provided by onboard positioning system 1612. This difference provides the trajectory of the receiving vehicle but not the location of the receiving vehicle. Taking the difference between these two coordinates removes the common satellite ephemeris error and the common atmospheric error present in the previous coordinates and last-determined coordinates such that the trajectory represented by the difference is more accurate than either of the two coordinates used to form the trajectory.

Similarly, the trajectory of the transmitting vehicle is updated by determining a difference between previous coordinates for the transmitting vehicle and the last-received coordinates of the transmitting vehicle. This also provides a trajectory for the transmitting vehicle but not the position of the transmitting vehicle. Taking the difference between these two coordinates removes the common satellite ephemeris error and the common atmospheric error present in the previous coordinates for the transmitting vehicle and last-determined coordinates for the transmitting vehicle such that the trajectory represented by the difference is more accurate than either of the two coordinates used to form the trajectory.

The position of the transmitting vehicle relative to the receiving vehicle is then determined by taking the difference between the last-received coordinates from the transmitting vehicle and the last-determined coordinates provided by the onboard positioning system 1612 of the receiving vehicle. The last-received coordinates from the transmitting vehicle and the last-determined coordinates provided by onboard positioning system 1612 were determined for a common time point and thus reflect the positions of the transmitting vehicle and receiving vehicle at a same point in time. The difference between the last-received coordinates from the transmitting vehicle and the last-determined coordinates provided by onboard positioning system 1612 provide a relative distance and orientation between the two vehicles but does not provide an absolute position for either vehicle. Taking the difference between these two coordinates removes the common satellite ephemeris error and the common atmospheric error present in the last-received coordinates for the transmitting vehicle and last-determined coordinates for the transmitting vehicle such that the distance and orientation between the coordinates is more accurate than either of the two coordinates used to form the distance and orientation.

The relative distance and orientation between the two vehicles can then be combined with the computed trajectories of the two vehicles to determine whether the vehicle receiving the information is behind, ahead of, or to the side of the transmitting vehicle. If the receiving vehicle is behind the transmitting vehicle, the receiving vehicle can use past trajectories of the transmitting vehicle as the expected trajectory for the receiving vehicle. If the receiving vehicle is to the side of the transmitting vehicle, the receiving vehicle can use the current trajectory of the transmitting vehicle as the expected trajectory for the receiving vehicle.

Although the trajectories and relative positions and orientations are discussed above for a receiving vehicle that receives coordinates from a single transmitting vehicle, in other embodiments, the receiving vehicle receives coordinates from a plurality of transmitting vehicles and computes trajectories and relative positions and orientations of each transmitting vehicle relative to the receiving vehicle.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A method comprising:
   accessing information stored for positions along a road;
   using the accessed information to identify an expected trajectory for a vehicle;
   receiving erroneous positions for the vehicle from a global positioning system for two different time points and determining a trajectory of the vehicle by determining a difference between the erroneous positions for the two different time points;
   using the trajectory of the vehicle and the expected trajectory to determine a lateral offset of the vehicle from the expected trajectory; and
   using the lateral offset to determine when to issue a lane departure warning for the vehicle by summing a plurality of lateral offsets to form a total lateral offset and comparing the total lateral offset to a threshold; and
   using the values of consecutive lateral offsets to determine when to reset the total lateral offset to zero such that the total lateral offset is reset to zero when a selected number of the consecutive lateral offsets are each less than a second threshold.

2. The method of claim 1 wherein the threshold is calculated based on the width of the vehicle and the width of a lane of the road.

3. The method of claim 1 wherein accessing information stored for positions along a road comprises accessing road-level information for a multi-lane road.

4. A vehicle comprising:
   a global positioning system providing coordinates for erroneous positions of the vehicle; and
   a processor:
      determining differences between coordinates for the erroneous positions of the vehicle to determine trajectories of the vehicle;
      using information about locations on a road to identify a preferred trajectory for the vehicle;
      using differences between the determined trajectories and the preferred trajectory to identify lane departure events by determining a lateral offset for each determined trajectory, accumulating a plurality of lateral offsets to form a total lateral offset, and comparing the total lateral offset to a lane departure threshold to identify a lane departure event; and
      using the values of consecutive lateral offsets to determine when to reset the total lateral offset to zero such that the total lateral offset is reset to zero when a selected number of the consecutive lateral offsets are each less than a second threshold.

5. The vehicle of claim 4 wherein the lane departure threshold is calculated based on the width of the vehicle and the width of a lane of the road.

6. The vehicle of claim 4 wherein the locations along the road are not positioned in a lane that the vehicle is traveling within.

7. A system comprising:
   a global positioning system that identifies a respective erroneous position of a vehicle at each of a series of time points;
   a memory containing information for locations along a road; and
   a processor that for each time point:
      determines a difference between an erroneous position of the vehicle from the global positioning system for the time point and an erroneous position of the vehicle from the global positioning system for a previous time point to determine a current trajectory for the vehicle at the time point,
      uses the information for the locations along the road to determine a preferred trajectory at the time point, and
      identifies a lane departure based on a lateral distance based on a difference between the current trajectory at the time point and the preferred trajectory at the time point wherein the processor identifies the lane departure by summing a plurality of lateral distances determined from the preferred trajectory for a plurality of time points to form a total lateral distance; and
      uses the values of a series of consecutive lateral distances to determine when to reset the total lateral distance to zero such that the processor resets the total lateral distance to zero when each of the series of consecutive lateral distances is smaller than a threshold.

8. The system of claim 7 wherein the locations along the road are outside of a lane that the vehicle is traveling in.

9. The system of claim 7 wherein the processor determines the preferred trajectory by setting a constant value for changes in the preferred trajectory at a set of locations along the road.

10. A method comprising:
accessing information stored for positions along a road;
using the accessed information to identify an expected trajectory for a vehicle through steps comprising:
for each of a plurality of positions, determining a direction from the position to a next position along the road; and
averaging the directions determined for the positions in the plurality of positions to determine the expected trajectory;
receiving erroneous positions for the vehicle from a global positioning system for two different time points and determining a trajectory of the vehicle by determining a difference between the erroneous positions for the two different time points;
using the trajectory of the vehicle and the expected trajectory to determine a lateral offset of the vehicle from the expected trajectory; and
using the lateral offset to determine when to issue a lane departure warning for the vehicle.

11. A method comprising:
accessing information stored for positions along a road;
using the accessed information to identify an expected trajectory for a vehicle through steps comprising:
for each of a plurality of positions:
determining a direction from the position to a next position along the road; and
determining a difference between a direction determined for the position and a direction determined for the next position along the road; and
averaging the differences determined for the positions in the plurality of positions to determine an average change in the expected trajectory across the plurality of positions; and
for each of the plurality of positions, calculating the expected trajectory at the position by adding the average change in the expected trajectory to an expected trajectory calculated for a previous position along the road;
receiving erroneous positions for the vehicle from a global positioning system for two different time points and determining a trajectory of the vehicle by determining a difference between the erroneous positions for the two different time points;
using the trajectory of the vehicle and the expected trajectory to determine a lateral offset of the vehicle from the expected trajectory; and
using the lateral offset to determine when to issue a lane departure warning for the vehicle.

12. A vehicle comprising:
a global positioning system providing coordinates for erroneous positions of the vehicle; and
a processor:
determining differences between coordinates for the erroneous positions of the vehicle to determine trajectories of the vehicle;
using information about locations on a road to identify a preferred trajectory for the vehicle through steps comprising:
for each of a plurality of locations on the road, determining a direction from the location to a next location along the road; and
averaging the directions determined for the locations in the plurality of locations to determine the preferred trajectory; and
using differences between the determined trajectories and the preferred trajectory to identify lane departure events.

13. A vehicle comprising:
a global positioning system providing coordinates for erroneous positions of the vehicle; and
a processor:
determining differences between coordinates for the erroneous positions of the vehicle to determine trajectories of the vehicle;
using information about locations on a road to identify a preferred trajectory for the vehicle through steps comprising:
for each of a plurality of locations along the road, determining a change in direction needed to reach the location from a respective previous location along the road;
averaging the needed changes in direction to produce an average change in direction; and
setting the preferred trajectory based on the average change in direction; and
using differences between the determined trajectories and the preferred trajectory to identify lane departure events.

* * * * *